United States Patent
Kojima

(10) Patent No.: US 8,224,239 B2
(45) Date of Patent: Jul. 17, 2012

(54) ANTENNA SELECTOR AND COMMUNICATION DEVICE

(75) Inventor: Suguru Kojima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 549 days.

(21) Appl. No.: 12/374,623

(22) PCT Filed: Jul. 21, 2006

(86) PCT No.: PCT/JP2006/314518
§ 371 (c)(1),
(2), (4) Date: Jan. 21, 2009

(87) PCT Pub. No.: WO2008/010299
PCT Pub. Date: Jan. 24, 2008

(65) Prior Publication Data
US 2010/0003941 A1    Jan. 7, 2010

(51) Int. Cl.
*H04B 7/185* (2006.01)
(52) U.S. Cl. .... 455/13.3; 455/101; 455/269; 455/562.1; 455/575.7; 375/148; 375/267; 343/702; 343/876
(58) Field of Classification Search ............... 455/13.3, 455/41.2, 101, 227.1, 269, 276.1, 552.1, 455/562.1, 575.3, 575.7; 375/148, 267; 343/700 R, 343/702, 876
See application file for complete search history.

(56) References Cited

U.S. PATENT DOCUMENTS

| | | | |
|---|---|---|---|
| 5,768,690 A * | 6/1998 | Yamada et al. | 455/78 |
| 2001/0016477 A1 * | 8/2001 | Harano | 455/277.1 |
| 2003/0048227 A1 * | 3/2003 | Nakamura | 343/702 |
| 2004/0198420 A1 * | 10/2004 | He et al. | 455/552.1 |
| 2005/0143151 A1 * | 6/2005 | Ito et al. | 455/575.3 |
| 2006/0276132 A1 * | 12/2006 | Sheng-Fuh et al. | 455/41.2 |

FOREIGN PATENT DOCUMENTS

| | | |
|---|---|---|
| JP | 04-274625 A | 9/1992 |
| JP | 8307334 A | 11/1996 |
| JP | 8321716 A | 12/1996 |
| JP | 10190516 A | 7/1998 |
| JP | 2000216716 A | 8/2000 |

OTHER PUBLICATIONS

Office Action mailed Mar. 1, 2011, in corresponding JP 2008-525776, with partial translation, 4 pages.

* cited by examiner

*Primary Examiner* — Shaima Q Aminzay
(74) *Attorney, Agent, or Firm* — Seed IP Law Group PLLC

(57) ABSTRACT

A transmitting/receiving circuit holds a communication at a frequency f1 by using an antenna or an antenna, and a transmitting/receiving circuit holds a communication at a frequency f2 by using an antenna. In response to a receiving signal intensity, a switching circuit connects any one of the antennas to the transmitting/receiving circuit as a selected antenna for use in communication, and connects the other antenna to a terminating circuit as a non-selected antenna. The terminating circuit connected to the non-selected antenna has an impedance that satisfies a predetermined phase condition at the frequencies f1, f2 respectively, suppresses an inter-antenna coupling between the non-selected antenna and the selected antenna and the antenna, and suppresses degradation in antenna characteristic caused due to the inter-antenna coupling between the selected antenna and the antenna.

12 Claims, 6 Drawing Sheets

ANTENNA SELECTOR AND COMMUNICATION DEVICE

TECHNICAL FIELD

The present invention relates to an antenna selector used in a communication device that is capable of holding simultaneously communication at a plurality of different frequencies and employs an antenna selecting diversity system that selects an antenna, which is to be connected to a radio circuit, from a plurality of antennas in response to a receiving signal intensity, and a communication device.

BACKGROUND ART

As the antenna selector used in the communication device employing the antenna selecting diversity system that selects the antenna for use in communication from a plurality of antennas, a non-selected branch terminating condition switching circuit is disclosed in Patent Literature 1, for example.

In an antenna selecting diversity reception of a mobile radio equipment on a time-division multiple access system (a communication device in which a signal is sent out only to a particular time slot to which each station is assigned), the non-selected branch terminating condition switching circuit set forth in Patent Literature 1 switches the optimum terminating condition for the non-selected branch (a receiving antenna) between a transmitting operation and a receiving operation while selecting a transmitting/receiving antenna.
Patent Literature 1: JP-B-3119642

DISCLOSURE OF THE INVENTION

Problems that the Invention is to Solve

However, in the above non-selected branch terminating condition switching circuit, the terminating condition for the non-selected branch is optimized at a single frequency. Therefore, in the simultaneous communication established at a plurality of different frequencies, it is difficult to optimize the terminating condition for the non-selected branch. As a result, such a problem exists that an antenna radiation efficiency is lowered due to a mutual coupling between the antenna for the non-selected branch and the antenna used in the communication.

The present invention has been made in view of the above problem, it is an object of the present invention to provide an antenna selector capable of suppressing degradation in antenna characteristics caused due to an inter-antenna coupling in a simultaneous communication at a plurality of different frequencies, and a communication device.

Means for Solving the Problems

First, the present invention provides an antenna selector used in a communication device that is capable of holding simultaneously communication at a plurality of different frequencies and employs an antenna selecting diversity system that selects an antenna, which is to be connected to a radio circuit, from a plurality of antennas in response to a receiving signal intensity, which comprises a terminating circuit having an impedance that satisfies a predetermined phase condition at the plurality of frequencies respectively; and a switching circuit which switches the plurality of antennas to select an antenna that is connected to the radio circuit, and connects a non-selected antenna except the antenna being connected to the radio circuit to the terminating circuit.

According to this configuration, the terminating circuit has the impedance that satisfies the predetermined phase condition at respective frequencies while the simultaneous communication is held at a plurality of different frequencies, and thus can optimize the terminating condition. Therefore, degradation in antenna characteristic caused due to an inter-antenna coupling can be suppressed.

Second, the present invention provides the antenna selector in which the terminating circuit has at least one of a parallel capacitance element and a series inductance element, and at least one of a series capacitance element and a parallel inductance element.

According to this configuration, the impedance at a relatively low frequency can be set by using at least one of the parallel inductance element and the series capacitance element, while the impedance at a relatively high frequency can be set by using at least one of the series inductance element and the parallel capacitance element.

Third, the present invention provides the antenna selector in which the terminating circuit has a variable inductance element and a variable capacitance element.

According to this configuration, the impedance of the terminating circuit can be adjusted. Therefore, the terminating condition can be optimized in response to the frequency for use in communication.

Fourth, the present invention provides the antenna selector, which further includes a control circuit for controlling constants of the variable inductance element and the variable capacitance element in the terminating circuit in response to the frequency used in the communication.

According to this configuration, the constants of the variable inductance elements and the variable capacitance elements in the terminating circuit are controlled in response to the frequency used in the communication. Therefore, the terminating condition can be optimized in answer to the frequency for use in communication.

Fifth, the present invention provides a communication device equipped with the antenna selector set forth in any one of the first aspect to the fourth aspect.

In an embodiment, an antenna selector comprises a first connector configured to connect to a first antenna, the first antenna resonating at a first resonant frequency; a second connector configured to connect to a second antenna, the second antenna resonating at a second resonant frequency different from the first resonant frequency; a third connector configured to connect to a third antenna; a terminator including a first impedance and a second impedance, the first impedance satisfying a first phase condition for terminating the third antenna at the first resonant frequency, and the second impedance satisfying a second phase condition for terminating the third antenna at the second resonant frequency; and a switching section configured to, when both of the first antenna and the second antenna are activated simultaneously, connect the terminator to the third connector. In an embodiment, the first resonant frequency is higher than the second resonant frequency, the first impedance has at least one of a parallel capacitance element and a series inductance element, and the second impedance has at least one of a series capacitance element and a parallel inductance element. In an embodiment, the first resonant frequency is variable, and the first impedance is configured to vary according to the first resonant frequency. In an embodiment, the second resonant frequency is variable, and the second impedance is configured to vary according to the second resonant frequency.

In an embodiment, a communication device comprises a first antenna configured to resonate at a first resonant frequency; a second antenna configured to resonate at a second resonant frequency different from the first resonant frequency; a third antenna; a terminator including a first impedance and a second impedance, the first impedance satisfying a first phase condition for terminating the third antenna at the first resonant frequency, and the second impedance satisfying a second phase condition for terminating the third antenna at the second resonant frequency; and a switching section configured to, when both of the first antenna and the second antenna are activated simultaneously, connect the terminator to the third connector. In an embodiment, the first resonant frequency is higher than the second resonant frequency, the first impedance has at least one of a parallel capacitance element and a series inductance element, and the second impedance has at least one of a series capacitance element and a parallel inductance element. In an embodiment, the first resonant frequency is variable, and the first impedance configured to vary according to the first resonant frequency. In an embodiment, the second resonant frequency is variable, and the second impedance is configured to vary according to the second resonant frequency.

According to this configuration, the terminating circuit has the impedance that satisfies the predetermined phase condition at respective frequencies while the simultaneous communication is held at a plurality of different frequencies, and thus can optimize the terminating condition. Therefore, degradation in antenna characteristic caused due to an inter-antenna coupling can be suppressed.

Advantages of the Invention

According to the present invention, the antenna selector and the communication device capable of suppressing the degradation in antenna characteristics caused due to an inter-antenna coupling in the simultaneous communication established at a plurality of different frequencies can be provided.

Figure 1:
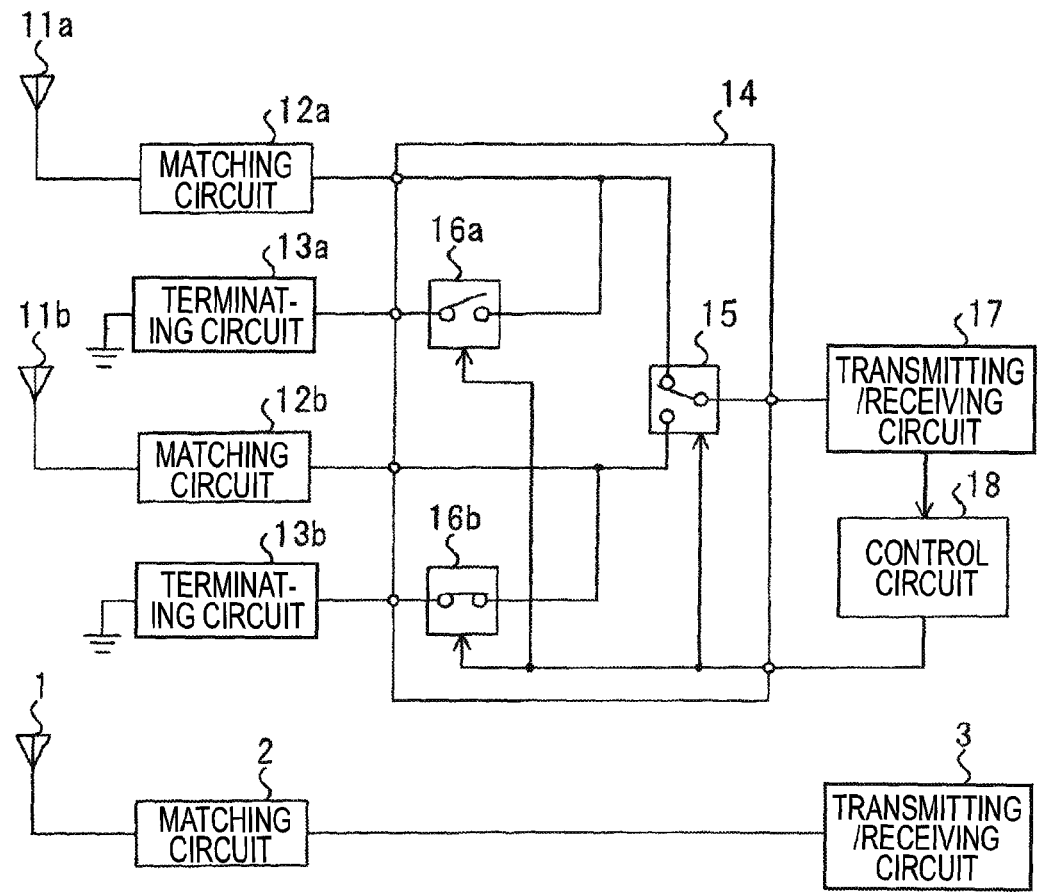
FIG. 1 A block diagram showing a major configuration of a communication device containing an antenna selector according to a first embodiment of the present invention.

DESCRIPTION OF REFERENCE NUMERALS AND SIGNS 1, 11a, 11b, 21a, 21b, 31a, 31b antenna
2, 12a, 12b, 22a, 22b, 32a, 32b matching circuit
3, 17 transmitting/receiving circuit
13, 13a, 13b, 23, 23a, 23b, 33, 33a, 33b terminating circuit
14 switching circuit
15 antenna selecting switch
16, 16a, 16b terminating circuit switching switch
18 control circuit
27 two-frequency common transmitting/receiving circuit
28 control circuit
37 multi-frequency common transmitting/receiving circuit
131, 134, 331, 334 inductance element
132, 133, 332, 333 capacitance element
231, 234 variable inductance element
232, 233 variable capacitance element

BEST MODE FOR CARRYING OUT THE INVENTION

First Embodiment

FIG. 1 is a block diagram showing a major configuration of a communication device containing an antenna selector according to a first embodiment of the present invention. As shown in FIG. 1, the communication device of the present embodiment includes antennas 11a, 11b, matching circuits 12a, 12b, terminating circuits 13a, 13b, a switching circuit 14, a transmitting/receiving circuit 17, and a control circuit 18. The antenna selecting diversity system for selecting the antenna to be connected to the transmitting/receiving circuit 17 from the antennas 11a, 11b in response to a receiving signal intensity is employed. In the present embodiment, it is assumed that the transmitting/receiving circuit 17 holds communication at a frequency f1 via the antennas 11a, 11b.

Also, the communication device of the present embodiment includes an antenna 1, a matching circuit 2, and a transmitting/receiving circuit 3. In the present embodiment, it is assumed that the transmitting/receiving circuit 3 holds communication at a frequency f2 different from the frequency f1 via the antenna 1. In this manner, the communication device of the present embodiment can hold simultaneously communication at a plurality of different frequencies f1, f2.

The matching circuits 12a, 12b establish an impedance matching between the antennas 11a, 11b and the transmitting/receiving circuit 17 respectively.

The terminating circuits 13a, 13b have an impedance that fulfills a predetermined phase condition at the frequencies f1, f2 used in the simultaneous communication in the communication device respectively. That is, the terminating circuits 13a, 13b give a terminating circuit that is used commonly to two frequencies of the frequencies f1, f2, respectively. In this case, the terminating circuits 13a, 13b have the similar configuration mutually, and these circuits will be explained as a terminating circuit 13 when it is not needed to explain them distinguishably.

Figure 2:
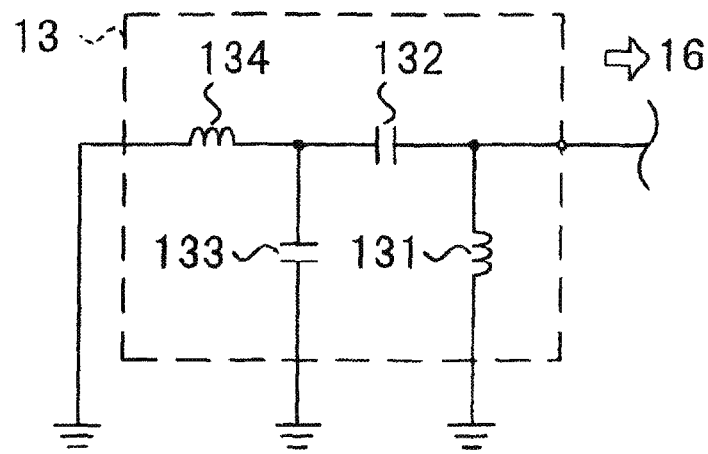
FIG. 2 A circuit diagram showing an example of a configuration of a terminating circuit according to the first embodiment of the present invention.

FIG. 2 is a circuit diagram showing an example of a configuration of a terminating circuit according to the first embodiment of the present invention. As shown in FIG. 2, the terminating circuit 13 has a parallel inductance element 131, a series capacitance element 132, a parallel capacitance element 133, and a series inductance element 134. In this case, there is no need that the terminating circuit 13 should always have these elements entirely. The terminating circuit 13 may have at least one of the parallel inductance element 131 and the series capacitance element 132 and at least one of the parallel capacitance element 133 and the series inductance element 134.

Commonly it is known that, as a reactance of the inductance L and the capacitance C at a frequency f, the parallel inductance element 131 has $1/(2\pi fL)$, the series capacitance element 132 has $1/(2\pi fC)$, the parallel capacitance element 133 has $2\pi fC$, and the series inductance element 134 has $2\pi fL$.

Here, when it is supposed that a relationship between the different frequencies f1, f2 is f1<f2, it is appreciated that phases of the parallel inductance element 131 and the series capacitance element 132 contribute largely to the whole phase of the terminating circuit 13 at a lower frequency f1 and phases of the parallel capacitance element 133 and the series inductance element 134 contribute largely to the whole phase of the terminating circuit 13 at a higher frequency f2.

Therefore, the phase condition of the non-selected antenna (antenna 11b or 11a) with respect to the selected antenna (antenna 11a or 11b) being operated at the frequency f1 should be constructed mainly by a combination of the parallel inductance element 131 and the series capacitance element 132. Also, the phase condition of the non-selected antenna with respect to the antenna 1 being operated at the frequency f2 should be constructed mainly by a combination of the parallel capacitance element 133 and the series inductance element 134. Thus, an inductance of a terminating circuit switching switch 16 can be set.

An example of the terminating circuit 13 constructed based on the above approach will be explained with reference to FIG. 3 to FIG. 8 hereunder. Here, the tuning is made under the assumption that the frequency f1 is 800 MHz and the frequency f2 is 2 GHz.

Figure 3:
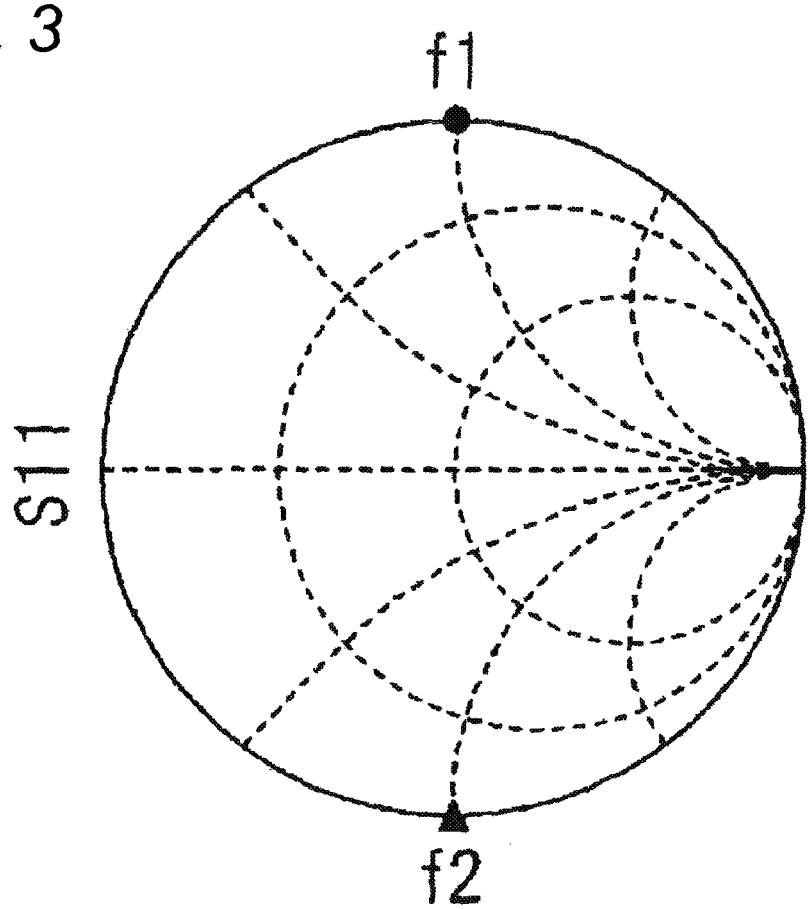
FIG. 3 A view explaining the first terminating condition in the first embodiment of the present invention.

FIG. 3 is a view explaining the first terminating condition in the first embodiment of the present invention. The first terminating condition is j50Ω at the frequency f1 and −j50Ω at the frequency f2, as illustrated in a Smith chart in FIG. 3.

Figure 4:
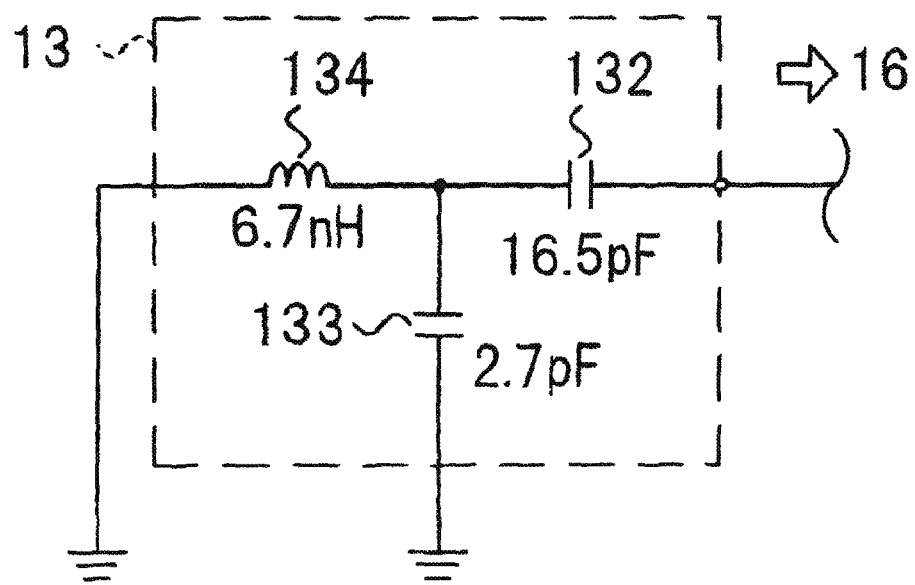
FIG. 4 A circuit diagram showing an example of a configuration of a terminating circuit that satisfies the first terminating condition in the first embodiment of the present invention.

FIG. 4 is a circuit diagram showing an example of a configuration of a terminating circuit that satisfies the first terminating condition in the first embodiment of the present invention. As shown in FIG. 4, as an example of the terminating circuit 13 that satisfies the first terminating condition, this circuit has the series capacitance element 132 of 16.5 pF, the parallel capacitance element 133 of 2.7 pF, and the series inductance element 134 of 6.7 nH. Accordingly, the terminating circuit 13 has the impedance that satisfies the first terminating condition, i.e., an impedance of j50Ω at the frequency f1 and an impedance of −j50Ω at the frequency f2.

Figure 5:
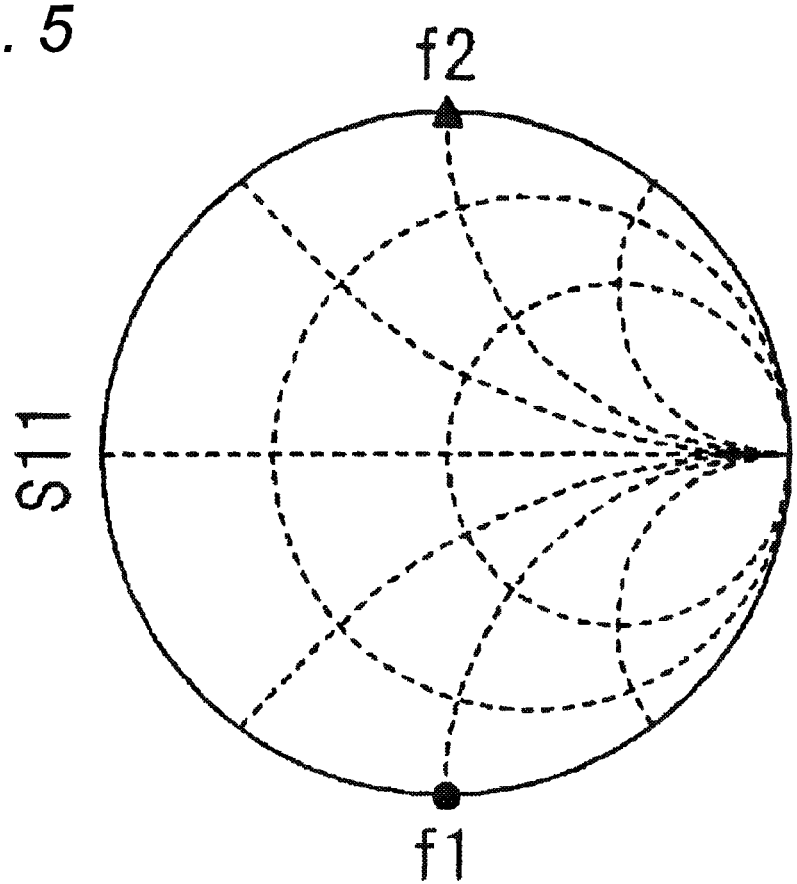
FIG. 5 A view explaining the second terminating condition in the first embodiment of the present invention.

FIG. 5 is a view explaining the second terminating condition in the first embodiment of the present invention. The second terminating condition is −j50Ω at the frequency f1 and j50Ω at the frequency f2, as illustrated in a Smith chart in FIG. 5.

Figure 6:
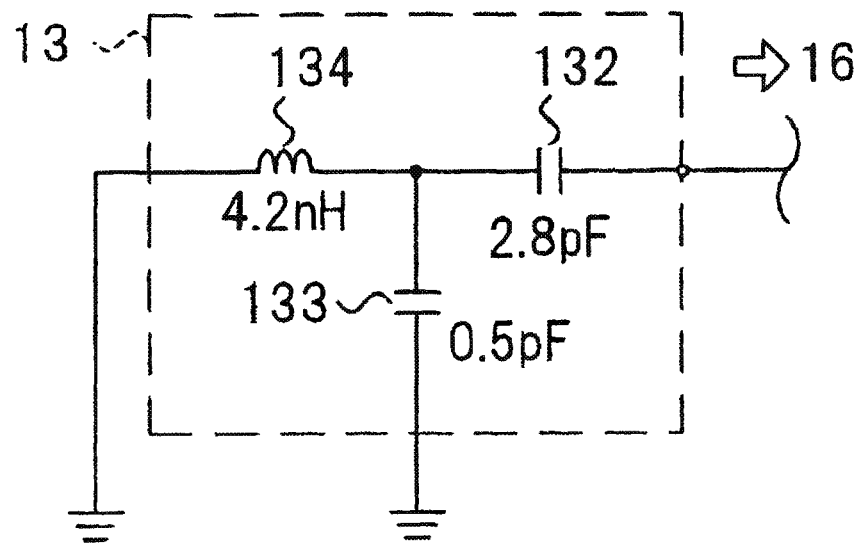
FIG. 6 A circuit diagram showing an example of a configuration of a terminating circuit that satisfies the second terminating condition in the first embodiment of the present invention.

FIG. 6 is a circuit diagram showing an example of a configuration of a terminating circuit that satisfies the second terminating condition in the first embodiment of the present invention. As shown in FIG. 6, as an example of the terminating circuit 13 that satisfies the second terminating condition, this circuit has the series capacitance element 132 of 2.8 pF, the parallel capacitance element 133 of 0.5 pF, and the series inductance element 134 of 4.2 nH. Accordingly, the terminating circuit 13 has the impedance that satisfies the second terminating condition, i.e., an impedance of −j50Ω at the frequency f1 and an impedance of j50Ω at the frequency f2.

Figure 7:
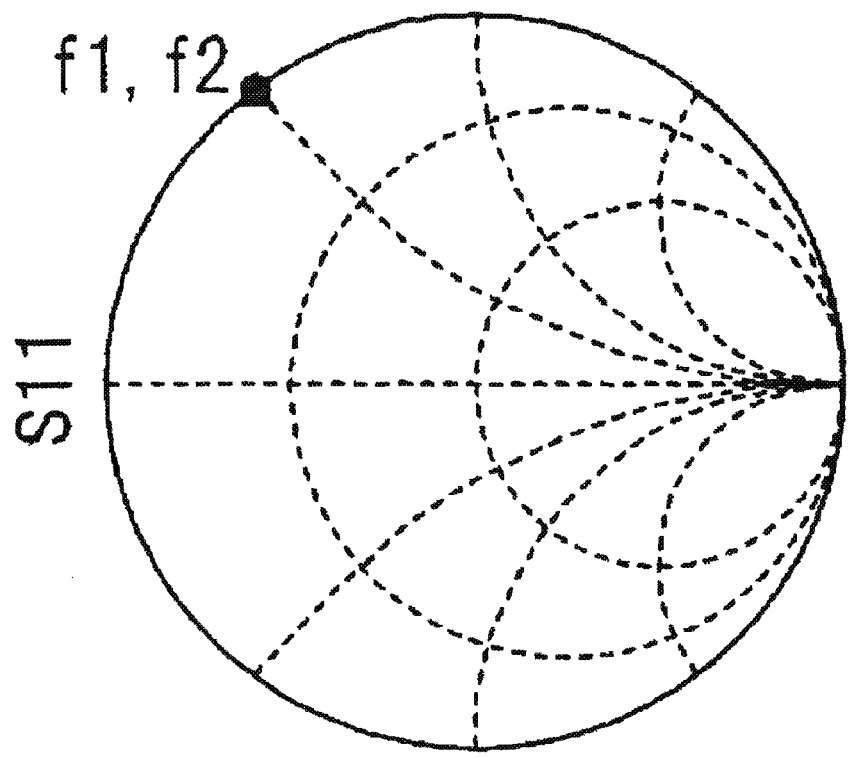
FIG. 7 A view explaining the third terminating condition in the first embodiment of the present invention.

FIG. 7 is a view explaining the third terminating condition in the first embodiment of the present invention. The third terminating condition is j25Ω at both frequencies f1, f2, as illustrated in a Smith chart in FIG. 7.

Figure 8:
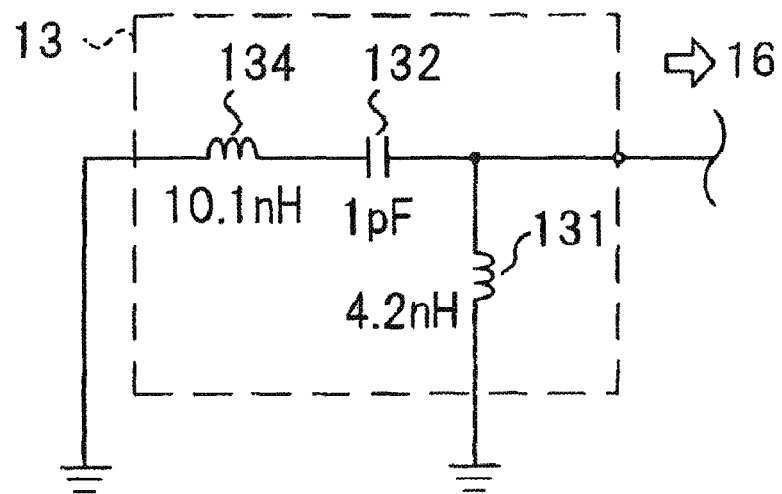
FIG. 8 A circuit diagram showing an example of a configuration of a terminating circuit that satisfies the third terminating condition in the first embodiment of the present invention.

FIG. 8 is a circuit diagram showing an example of a configuration of a terminating circuit that satisfies the third terminating condition in the first embodiment of the present invention. As shown in FIG. 8, as an example of the terminating circuit 13 that satisfies the third terminating condition, this circuit has the parallel inductance element 131 of 4.2 nH, the series capacitance element 132 of 1 pF, and the series inductance element 134 of 10.1 nH. Accordingly, the terminating circuit 13 has the impedance that satisfies the third terminating condition, i.e., an impedance of j25Ω at both frequencies f1, f2.

Like above three examples, the terminating circuit 13 adjusts a phase of the non-selected antenna (the antenna 11a or 11b) with respect to respective antennas (the antenna 11b or 11a and the antenna 1), which are holding the simultaneous communication at the different frequencies f1, f2, into a desired phase and thus can optimize the terminating condition. Therefore, the degradation in characteristics of the antennas used in the communication caused due to the mutual coupling between the non-selected antenna and the antenna for use in communication can be suppressed.

The switching circuit 14 has an antenna selecting switch 15, and terminating circuit switching switches 16a, 16b. The switching circuit 14 selects the antenna that is to be connected to the transmitting/receiving circuit 17, by switching a plurality of antennas 11a, 11b based on a control signal output from the control circuit 18, and connects the non-selected antennas except the antenna, which is to be connected to the transmitting/receiving circuit 17, to the terminating circuit 13.

The antenna selecting switch 15 switches either of the matching circuits 12a, 12b based on the control signal from the control circuit 18 and connects this switched circuit to the transmitting/receiving circuit 17, and thus selects the antenna for use in communication. The terminating circuit switching switches 16a, 16b switch the connection/disconnection between the matching circuits 12a, 12b and the terminating circuits 13a, 13b based on the control signal from the control circuit 18 respectively. The terminating circuit switching switch 16 that is connected to the transmitting/receiving circuit 17 by the antenna selecting switch 15 does not connect the matching circuit and the terminating circuit, while the terminating circuit switching switch 16 that is not connected to the transmitting/receiving circuit 17 by the antenna selecting switch 15 connects the matching circuit and the terminating circuit.

The transmitting/receiving circuit 17 make transmission/reception to/from the communication destination such as a base station unit, or the like via the antenna, which is connected via the switching circuit 14, out of the antennas 11a, 11b. The control circuit 18 detects the receiving signal intensity from the signal received by the transmitting/receiving circuit 17. Then, the control circuit 18 outputs the switching signal, which selects either of the antennas 11a, 11b in response to the receiving signal intensity, to the antenna selecting switch 15 and the terminating circuit switching switches 16a, 16b in the switching circuit 14.

An operation of the antenna selector of the present embodiment constructed in this manner will be explained hereunder. In the following, the case where the control circuit 18 controls the switching circuit 14 to select the antenna 11a as the antenna that is connected to the transmitting/receiving circuit 17 and not select the antenna 11b is explained by way of example.

As shown in FIG. 1, the antenna 11a as the selected antenna is connected to the transmitting/receiving circuit 17 when the terminating circuit switching switch 16a is opened and the antenna selecting switch 15 is closed based on the control signal from the control circuit 18, and holds communication at the frequency f1. In contrast, the antenna 11b as the non-selected antenna is connected to the terminating circuit 13b when the terminating circuit switching switch 16b is closed and the antenna selecting switch 15 is opened. The antenna 1 holds communication at the frequency f2 when this antenna is connected to the transmitting/receiving circuit 3 via the matching circuit 2.

At this time, the termination of the non-selected antenna 11b is adjusted to the optimum phase with respect to the selected antenna 11a being operated at the frequency f1 and the antenna 1 being operated at the frequency f2, by the terminating circuit 13b for two-frequency common use. Therefore, an inter-antenna coupling between the non-selected antenna 11b and the selected antenna 11a and an inter-antenna coupling between the non-selected antenna 11b and the antenna 1 can be reduced. As a result, the degradation in the antenna characteristics of the antenna 11a for use in communication and the antenna 1 can be suppressed.

According to such first embodiment of the present invention, the terminating circuit connected to the non-selected antenna has the impedance that satisfies the predetermined phase condition at respective frequencies while the simultaneous communication is established at a plurality of different frequencies, and thus the terminating condition can be optimized. Therefore, the degradation in the antenna characteristics caused due to the inter-antenna coupling can be suppressed.

Second Embodiment

Figure 9:
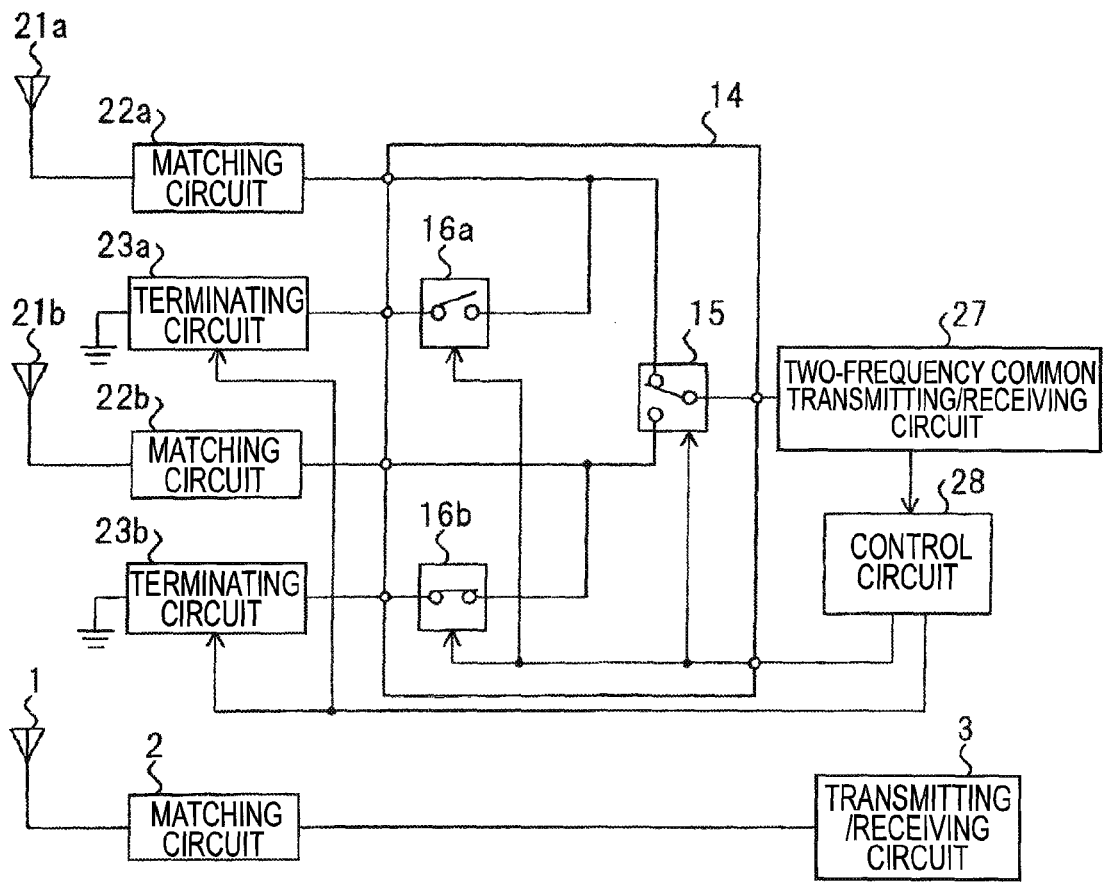
FIG. 9 A block diagram showing a major configuration of a communication device containing an antenna selector according to a second embodiment of the present invention.
Figure 10:
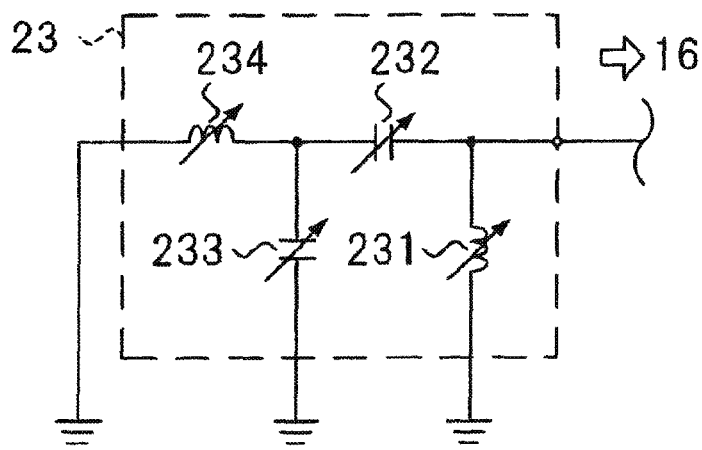
FIG. 10 A circuit diagram showing an example of a configuration of a terminating circuit according to the second embodiment of the present invention.

FIG. 9 is a block diagram showing a major configuration of a communication device containing an antenna selector according to a second embodiment of the present invention, and FIG. 10 is a circuit diagram showing an example of a configuration of a terminating circuit according to the second embodiment of the present invention. In FIG. 9, the same reference symbols are affixed to the overlapping portions with those explained in the first embodiment and shown in FIG. 1.

As shown in FIG. 9, the communication device of the present embodiment includes antennas 21a, 21b, matching circuits 22a, 22b, terminating circuits 23a, 23b, the switching circuit 14, a two-frequency common transmitting/receiving circuit 27, and a control circuit 28. In this case, the terminating circuits 23a, 23b have the similar configuration mutually, and these circuits will be explained as a terminating circuit 23 when it is not needed to explain them distinguishably.

The antennas 21a, 21b and the two-frequency common transmitting/receiving circuit 27 can be used commonly at two different frequencies. In the present embodiment, it is assumed that the two-frequency common transmitting/receiving circuit 27 allows the communication via the antennas 21a, 21b while selecting either of the frequencies f1, f3.

Also, like the first embodiment, it is assumed that the communication device of the present embodiment has the antenna 1, the matching circuit 2, and the transmitting/receiving circuit 3, and also holds communication at the frequency f2. In this manner, the communication device of the present embodiment can establish the communication simultaneously at a plurality of different frequencies f1 and f2 or frequencies f1 and f3.

In addition to the control signal for the switching circuit 14, the control circuit 28 outputs a control signal to the terminating circuits 23a, 23b in answer to the frequency (the frequency f1 or f3) at which the communication is established by the two-frequency common transmitting/receiving circuit 27.

The terminating circuit 23 optimizes the phase conditions of the selected antenna (the antenna 21a or 21b) that operates at the frequency f1 or f3 and the non-selected antenna (the antenna 21a or 21b) with respect to the antenna 1 that operates at the frequency f2.

As shown in FIG. 10, the terminating circuit 23 has a variable parallel inductance element 231 whose inductance value is variable, a variable series capacitance element 232 whose capacitance value is variable, a variable parallel capacitance element 233 whose inductance value is variable, and a variable series inductance element 234 whose capacitance value is variable. In this case, there is no need that the terminating circuit 23 should always have these elements entirely. The terminating circuit 23 may have at least one of the parallel variable inductance element 231 and the series variable capacitance element 232 and at least one of the parallel variable capacitance element 233 and the series variable inductance element 234.

Accordingly, in the terminating circuit 23, respective values of the variable inductance elements and the variable capacitance elements are set based on the control signal that is output from the control circuit 28 to respond to the frequency f1 or f3 at which the communication is established by the two-frequency common transmitting/receiving circuit 27.

Here, constants of respective elements of the terminating circuit 23 are decided by using the approach set forth in the first embodiment. Also, these constants of respective elements are switched in response to the communication held at the frequency f1 and the frequency f2 or the communication held at the frequency f2 and the frequency f3.

An operation of the antenna selector in the present embodiment constructed in this manner will be explained hereunder. In the following, the case where the control circuit 28 controls the switching circuit 14 to select the antenna 21a as the antenna that is connected to the two-frequency common transmitting/receiving circuit 27 and not to select the antenna 21b will be explained by way of example.

As shown in FIG. 9, the antenna 21a as the selected antenna is connected to the two-frequency common transmitting/receiving circuit 27 when the terminating circuit switching switch 16a is opened and the antenna selecting switch 15 is closed based on the control signal from the control circuit 28, and then is used for the communication. In contrast, the antenna 21b as the non-selected antenna is connected to the terminating circuit 23b when the terminating circuit switching switch 16b is closed and the antenna selecting switch 15 is opened. The antenna 1 establishes the communication at the frequency f2 when this antenna is connected to the transmitting/receiving circuit 3 via the matching circuit 2.

While the two-frequency common transmitting/receiving circuit 27 holds the communication at the frequency f1, the selected antenna 21a operates at the frequency f1 and the antenna 1 operates at the frequency f2. The control circuit 28 controls the constants of respective elements in response to the frequency f1 that is used in the communication by the two-frequency common transmitting/receiving circuit 27. Also, constants of respective variable elements of the terminating circuit 23b are set under control of the control circuit 28 so as to satisfy a desired terminating condition at the frequency f1 and the frequency f2 respectively. That is, the terminating circuit 23b functions as the terminating circuit common to two frequencies of the frequency f1 and the frequency f2.

Therefore, the termination of the non-selected antenna 21b is adjusted to the optimum phase by the terminating circuit 23b used commonly to two frequencies of the frequency f1 and the frequency f2, with respect to the selected antenna 21a that operates at the frequency f2 and the antenna 1 that operates at the frequency f2. As a result, an inter-antenna coupling between the non-selected antenna 21b and the selected antenna 21a and an inter-antenna coupling between the non-selected antenna 21b and the antenna 1 can be reduced, and thus the degradation in antenna characteristics of the antenna 21a for use in communication and the antenna 1 can be suppressed.

While the two-frequency common transmitting/receiving circuit 27 holds the communication at the frequency f3, the selected antenna 21a operates at the frequency f3 and the antenna 1 operates at the frequency f2. The control circuit 28 controls the constants of respective elements in response to the frequency f3 that is used in the communication by the two-frequency common transmitting/receiving circuit 27. Also, constants of respective variable elements of the terminating circuit 23b are set under control of the control circuit 28 so as to satisfy a desired terminating condition at the frequency f3 and the frequency f2 respectively. That is, the terminating circuit 23b functions as the terminating circuit common to two frequencies of the frequency f3 and the frequency f2.

Therefore, the termination of the non-selected antenna 21b is adjusted to the optimum phase by the terminating circuit 23b used commonly to two frequencies of the frequency f3 and the frequency f2, with respect to the selected antenna 21a that operates at the frequency f3 and the antenna 1 that operates at the frequency f2. As a result, an inter-antenna coupling between the non-selected antenna 21b and the selected antenna 21a and an inter-antenna coupling between the non-selected antenna 21b and the antenna 1 can be reduced, and thus the degradation in antenna characteristics of the antenna 21a for use in communication and the antenna 1 can be suppressed.

According to such second embodiment of the present invention, even though the frequency at which the simultaneous communication is established is switched, the terminating circuit connected to the non-selected antenna can have the impedance that satisfies the predetermined phase condition in response to the frequency for use in communication, so that the terminating condition can be optimized. As a result, the degradation in antenna characteristics caused due to the inter-antenna coupling can be suppressed.

Third Embodiment

Figure 11:
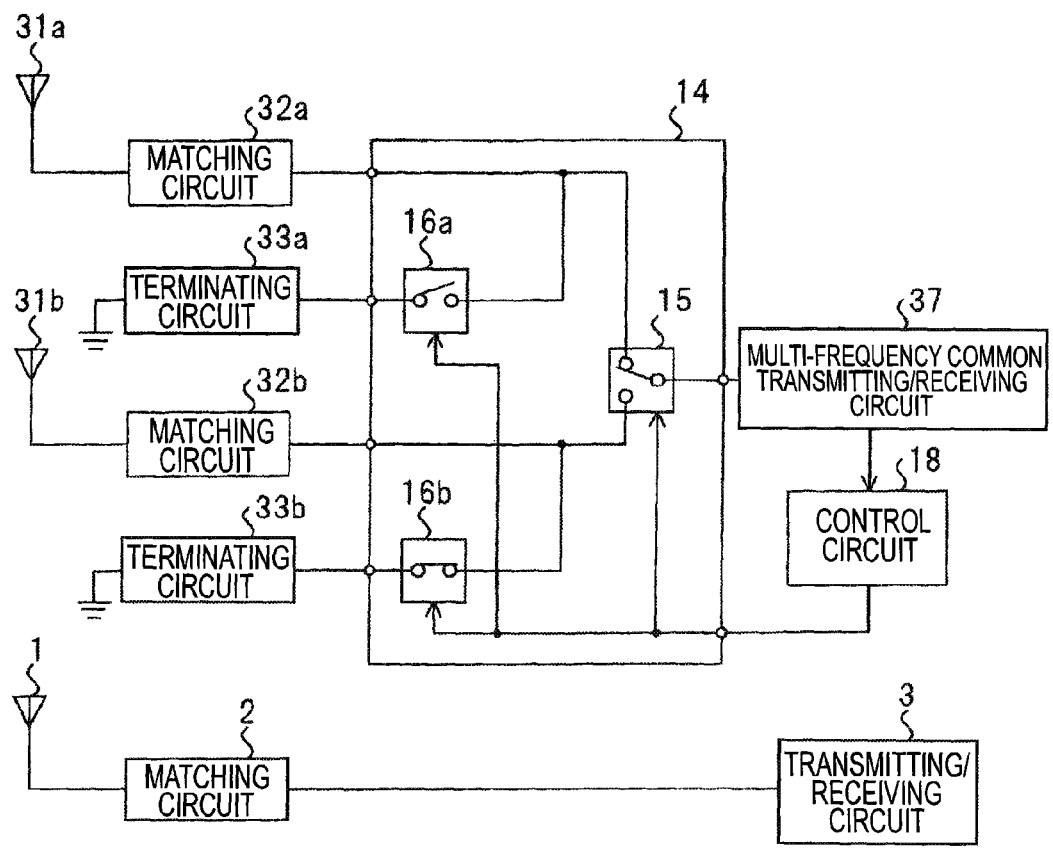
FIG. 11 A block diagram showing a major configuration of a communication device containing an antenna selector according to a third embodiment of the present invention.
Figure 12:
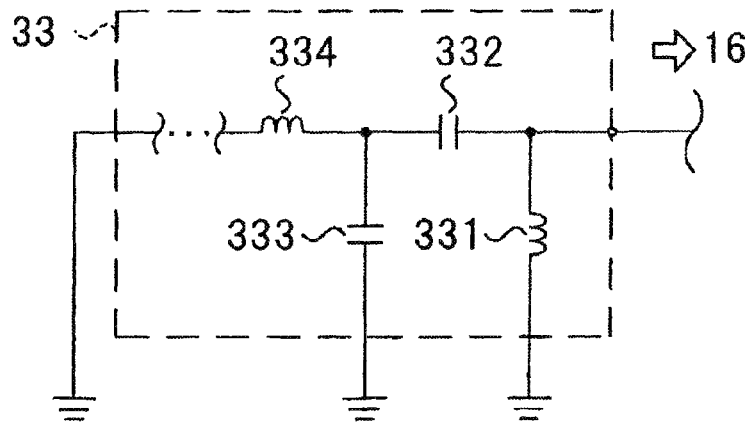
FIG. 12 A circuit diagram showing an example of a configuration of a terminating circuit according to the third embodiment of the present invention.

FIG. 11 is a block diagram showing a major configuration of a communication device containing an antenna selector according to a third embodiment of the present invention, and FIG. 12 is a circuit diagram showing an example of a configuration of a terminating circuit according to the third embodiment of the present invention. In FIG. 11, the same reference symbols are affixed to the overlapping portions with those explained in the first embodiment and shown in FIG. 1.

As shown in FIG. 11, the communication device of the present embodiment includes antennas 31a, 31b, matching circuits 32a, 32b, terminating circuits 33a, 33b, the switching circuit 14, a multi-frequency common transmitting/receiving circuit 37, and the control circuit 18. In this case, the terminating circuits 33a, 33b have the similar configuration mutually, and these circuits will be explained as a terminating circuit 33 when it is not needed to explain them distinguishably.

The antennas 31a, 31b and the multi-frequency common transmitting/receiving circuit 37 can be used commonly at (n−1) different frequencies (n is an integer in excess of 3). In the present embodiment, it is assumed that the multi-frequency common transmitting/receiving circuit 37 allows the communication simultaneously via the antennas 31a, 31b while using the frequencies f1, f2, . . . , f(n−1).

Also, like the first embodiment, it is assumed that the communication device of the present embodiment includes the antenna 1, the matching circuit 2, and the transmitting/receiving circuit 3. In the present embodiment, it is assumed that the transmitting/receiving circuit 3 holds the communication at a frequency fn. In this manner, the communication device of the present embodiment can hold simultaneously the communication at n different frequencies f1 to fn.

The terminating circuits 33a, 33b have the impedance that satisfies a predetermined phase condition at the frequencies f1 to fn, which are used in the simultaneous communication in the communication device, respectively. That is, the terminating circuits 33a, 33b give a terminating circuit used commonly to the frequencies f1 to fn respectively. In this case, the terminating circuits 33a, 33b have the similar configuration mutually, and these circuits will be explained as a terminating circuit 33 when it is not needed to explain them distinguishably.

As shown in FIG. 12, the terminating circuit 33 has a parallel inductance element 331, a series capacitance element 332, a parallel capacitance element 333, and a series inductance element 334. Also, if necessary, an inductance element or a capacitance element is connected in series or in parallel to the later stage of the series inductance element 334. In this case, the terminating circuit 33 has at least n elements.

Accordingly, the termination of the non-selected antenna (the antenna 31a or 31b) is adjusted to the desired phase with respect to respective antennas (the antenna 31b or 31a and the antenna 1) that are used in the simultaneous communication at the different frequencies f1 to fn, and thus the terminating condition can be optimized. As a result, the degradation in the antenna characteristics of the antenna 11a for use in communication, which is caused due to the mutual coupling between the non-selected antenna and the antenna used in the communication, can be suppressed.

According to such third embodiment of the present invention, the terminating circuit connected to the non-selected antenna has the impedance that satisfies the predetermined phase condition at respective frequencies while the simultaneous communication is established at a plurality of different frequencies, and thus the terminating condition can be optimized. Therefore, the degradation in the antenna characteristics caused due to the inter-antenna coupling can be suppressed.

In the first to third embodiments of the present invention, explanation concerning the communication device that is operated by the transmitting/receiving circuits in two systems is made. The present invention is not limited to this system, and any system may be employed if such communication device can hold the simultaneous communication at two different frequencies. Also, the terminating circuit may be constructed by a combination of fixed reactance elements and variable reactance elements.

INDUSTRIAL APPLICABILITY

The antenna selector and the communication device of the present invention has such an advantage that the degradation in antenna characteristics caused due to an inter-antenna coupling can be suppressed in the simultaneous communication established at a plurality of different frequencies, and is useful to the mobile radio equipment, and the like.

The invention claimed is:

1. An antenna selector, comprising:
a first connector configured to connect to a first antenna, the first antenna operating at a first frequency;
a second connector configured to connect to a second antenna, the second antenna operating at a second frequency different from the first frequency;
a third connector configured to connect to a third antenna;
a terminator including a first impedance and a second impedance, the first impedance satisfying a first phase condition for terminating the third antenna at the first frequency, and the second impedance satisfying a second phase condition for terminating the third antenna at the second frequency; and
a switching section configured to, when both of the first antenna and the second antenna are activated simultaneously, connect the terminator to the third connector.

2. The antenna selector according to claim 1 wherein,
the first frequency is higher than the second frequency,
the first impedance has at least one of a parallel capacitance element and a series inductance element, and
the second impedance has at least one of a series capacitance element and a parallel inductance element.

3. The antenna selector according to claim 1 wherein,
the first impedance is controlled according to the first frequency.

4. The antenna selector according to claim 1 wherein,
the second impedance is controlled according to the second frequency.

5. A communication device comprising:
a first antenna configured to operate at a first frequency;
a second antenna configured to operate at a second frequency different from the first frequency;
a third antenna;
a terminator including a first impedance and a second impedance, the first impedance satisfying a first phase condition for terminating the third antenna at the first frequency, and the second impedance satisfying a second phase condition for terminating the third antenna at the second frequency; and
a switching section configured to, when both of the first antenna and the second antenna are activated simultaneously, connect the terminator to the third antenna.

6. The communication device according to claim 5 wherein,
the first frequency is higher than the second frequency,
the first impedance has at least one of a parallel capacitance element and a series inductance element, and
the second impedance has at least one of a series capacitance element and a parallel inductance element.

7. The communication device according to claim 5, wherein,
the first impedance is controlled according to the first frequency.

8. The communication device according to claim 5, wherein,
the second impedance is controlled according to the second frequency.

9. A communication device comprising:
a first antenna configured to operate at a first frequency;
a second antenna configured to operate at a second frequency different from the first frequency;
a third antenna;
a terminator including variable inductance elements and variable capacitance elements, and
a switch configured to, when both of the first antenna and the second antenna are activated simultaneously, connect the terminator to the third antenna, wherein constants of the variable inductance elements and the variable capacitance elements of the terminator are controlled in response to the first and second frequencies.

10. The communication device according to claim 9 wherein
the first frequency is higher than the second frequency; and
the terminator includes:
a first impedance having at least one of a parallel capacitance element and a series inductance element, and
a second impedance having at least one of a series capacitance element and a parallel inductance element.

11. The communication device according to claim 10 wherein,
the first impedance is adjusted according to the first frequency.

12. The communication device according to claim 10 wherein,
the second impedance is adjusted according to the second frequency.

* * * * *